(12) United States Patent
Xu et al.

(10) Patent No.: US 10,704,594 B2
(45) Date of Patent: Jul. 7, 2020

(54) ROLLING DEEP GROOVE BALL BEARING

(71) Applicant: TRANF TECHNOLOGY (XIAMEN) CO., LTD., Xiamen (CN)

(72) Inventors: Shuidian Xu, Xiamen (CN); Yanfu Li, Xiamen (CN); Tao Xu, Xiamen (CN)

(73) Assignee: TRANF TECHNOLOGY (XIAMEN) CO., LTD., Xiamen, Fujian (CN)

( * ) Notice: Subject to any disclaimer, the term of this patent is extended or adjusted under 35 U.S.C. 154(b) by 0 days.

(21) Appl. No.: 16/389,848

(22) Filed: Apr. 19, 2019

(65) Prior Publication Data
US 2019/0242431 A1 Aug. 8, 2019

Related U.S. Application Data

(63) Continuation of application No. PCT/CN2017/107153, filed on Oct. 20, 2017.

(30) Foreign Application Priority Data

Oct. 21, 2016 (CN) .......................... 2016 1 0917397

(51) Int. Cl.
*F16C 19/06* (2006.01)
*F16C 33/36* (2006.01)
(Continued)

(52) U.S. Cl.
CPC .............. *F16C 19/06* (2013.01); *F16C 19/20* (2013.01); *F16C 19/49* (2013.01); *F16C 33/363* (2013.01);
(Continued)

(58) Field of Classification Search
CPC .. F16C 33/37; F16C 33/3706; F16C 33/3713; F16C 19/06; F16C 19/20; F16C 19/49;
(Continued)

(56) References Cited

U.S. PATENT DOCUMENTS 956,676 A * 5/1910 Bright ...................... F16C 19/20
384/552
997,921 A * 7/1911 Keiper ...................... F16C 19/20
384/552
(Continued)

FOREIGN PATENT DOCUMENTS

CN 1042972 A 6/1990
CN 1244635 A 2/2000
(Continued)

OTHER PUBLICATIONS

The International Search Report of corresponding International PCT application No. PCT/CN2017/107153, dated Jan. 18, 2018.
(Continued)

*Primary Examiner* — Alan B Waits
(74) *Attorney, Agent, or Firm* — J.C. Patents

(57) ABSTRACT

A rolling deep groove ball bearing includes a bearing outer ring (1), a bearing inner ring (2), a plurality of large rolling balls (3) and special-shaped rollers (4), where the large rolling balls (3) and special-shaped rollers (4) are arranged between the bearing inner ring (1) and the bearing outer ring (2), and the large rolling balls (3) and the special-shaped rollers (4) are arranged at intervals. For the rolling deep groove ball bearing, the rolling balls (3) and the bearing raceway realize the pure rolling, where high linear velocity is subjected; the bearing capacity is large; the noise is low; the reliability is high and the service life is long. The deep groove ball bearing has no gap for installing balls and is simply assembled.

4 Claims, 3 Drawing Sheets

(51) Int. Cl.
*F16C 33/37* (2006.01)
*F16C 19/49* (2006.01)
*F16C 19/20* (2006.01)

(52) U.S. Cl.
CPC ...... *F16C 33/3713* (2013.01); *F16C 2240/26* (2013.01); *F16C 2240/42* (2013.01); *F16C 2240/46* (2013.01); *F16C 2322/39* (2013.01); *F16C 2326/01* (2013.01); *F16C 2326/10* (2013.01); *F16C 2326/43* (2013.01); *F16C 2326/47* (2013.01)

(58) Field of Classification Search
CPC ................ F16C 33/363; F16C 2240/26; F16C 2240/42; F16C 2240/46; F16C 2322/39; F16C 2326/01; F16C 2326/10; F16C 2326/43; F16C 2326/47
See application file for complete search history.

(56) References Cited

U.S. PATENT DOCUMENTS

| | | | | |
|---|---|---|---|---|
| 1,972,355 | A * | 9/1934 | Peters | F16C 19/40 384/553 |
| 2,581,722 | A * | 1/1952 | Simmons | F16C 19/20 384/552 |
| 3,124,396 | A * | 3/1964 | Barager | F16C 19/20 384/522 |
| 3,790,239 | A * | 2/1974 | Laux | F16C 19/20 384/463 |
| 4,372,633 | A * | 2/1983 | Allen | H01R 39/64 310/232 |
| 4,795,279 | A * | 1/1989 | Smith | F16C 19/20 384/450 |
| 4,859,090 | A * | 8/1989 | Smith | F16C 19/16 384/463 |
| 2004/0091189 | A1* | 5/2004 | Yu | F16C 19/20 384/522 |

FOREIGN PATENT DOCUMENTS

| | | |
|---|---|---|
| CN | 2366607 Y | 3/2000 |
| CN | 2479285 Y | 2/2002 |
| CN | 101078420 A | 11/2007 |
| CN | 101782112 A | 7/2010 |
| CN | 106640954 A | 5/2017 |
| DE | 165460 C | 11/1905 |
| DE | 165758 C | 12/1905 |
| DE | 103 29 098 A1 | 1/2005 |
| JP | 2009236314 | 10/2009 |

OTHER PUBLICATIONS

The Chinese First Examination Report, including the Search Report, of corresponding Chinese application No. 201610917397.X, dated Apr. 4, 2018.
First Office Action of the corresponding JP application.

* cited by examiner

ROLLING DEEP GROOVE BALL BEARING

CROSS-REFERENCE TO RELATED APPLICATIONS

This application is a continuation of International Application No. PCT/CN2017/107153, filed on Oct. 20, 2017, which claims priority to Chinese Patent Application No. 201610917397.X, filed on Oct. 21, 2016. The disclosures of the aforementioned applications are hereby incorporated by reference in their entireties.

TECHNICAL FIELD

The present disclosure relates to a bearing, in particular to a rolling deep groove ball bearing.

BACKGROUND

Neither deep groove ball bearing with a cage nor deep groove ball bearing with full-ball can solve the problem of the sliding friction between the rolling balls and the raceway. A deep groove ball bearing with the cage causes the sliding friction between the rolling balls and the raceway due to friction between the rolling balls and the cage. For a deep groove ball bearing with full-ball, when it works, two adjacent balls are loaded at the same time. The frictional resistance between the rolling balls and a raceway increases sharply when the two rolling balls are in contact with each other, thereby the sliding friction occurs. Especially during the high-speed heavily loading, the rolling balls and the bearing raceway are extremely easy to be worn and burn, thereby the service life is short, and high-end demands cannot be satisfied. The deep groove ball bearing with full-ball has a structural feature of no cage, where the gaps for installing ball are designed on an outer ring and an inner ring, thereby more balls are installed than an ordinary bearing. This kind of bearing is of low friction and high sensitivity and are widely used in flight attitude and direction control systems for astronautic, aerial and navigational devices, because there is no friction between the cage and ferrule and rolling body. However, this kind of bearing with full-ball often configures the gaps on outer sides of a bearing outer ring and a bearing inner ring, respectively. When the gaps for installing ball at the outer ring and the inner ring are aligned, a gap for installing balls is formed for filling balls. Although bearing capacity is improved, there is a risk that the rolling balls are fallen from the gap when the rolling balls are subjected to a axial force, since the ball can pass through the gap for installing balls after the gaps for installing ball at the outer ring and the inner ring are aligned, causing the bearing to be stuck and unable to rotate normally, and there is security threat.

SUMMARY

With respect to the deficiencies of the prior art, the present disclosure not only provides a rolling deep groove ball bearing, where the rolling balls and a bearing raceway realize the pure rolling; the high linear velocity, the large bearing capacity, the low noise, the high reliability and the long service life. Meanwhile, a rolling deep groove ball bearing with no gap for installing balls and being simply assembled are invented.

In order to achieve the above object, the present disclosure is achieved by the following technical solution.

A rolling deep groove ball bearing comprises a bearing outer ring, a bearing inner ring, a plurality of large rolling balls and special-shaped rollers, where the large rolling balls and the special-shaped rollers are arranged between the bearing inner ring and the bearing outer ring, and the large rolling balls and the special-shaped rollers are arranged at intervals.

Further, a groove is provided in middle of the special-shaped rollers, and a numerical value of the groove depth e is $0.03\ mm < e < d1/3$, where d1 is diameter of the large rolling balls.

Further, a relationship between a diameter da of the special-shaped rollers and a distance h between the inner ring and the outer ring is: $h-da=0.005 \sim 0.2\ mm$, h is $(D2-d2)/2$, where D2 is an inner diameter of the outer ring, and d2 is an outer diameter of the inner ring.

Further, a numerical value of a total gap s between the large rolling balls and the special-shaped rollers is: $0.03\ mm < s < e$, where e is a groove depth of the special-shaped rollers.

For the deep groove ball bearing with full-ball of the present disclosure, the rolling balls and the bearing raceway realize the pure rolling, where the friction coefficient is small; the high linear velocity is subjected; the bearing capacity is large; the noise is small, the reliability is high; especially, there is no gap for installing balls; and the assembly is convenient.

Applications of the rolling deep groove ball bearing of the present disclosure not only promote the development of the metallurgy, the electric power, the building machinery, the building materials, the energy and other industries, but also meet the applications of the high-end fields such as the automobile, the wind power, the high-grade machine tool, high-speed rail, the aerospace, the national defense and military, and the like.

DESCRIPTION OF EMBODIMENTS

The present disclosure is further described below in combination with the accompanying drawings.

Figure 1:
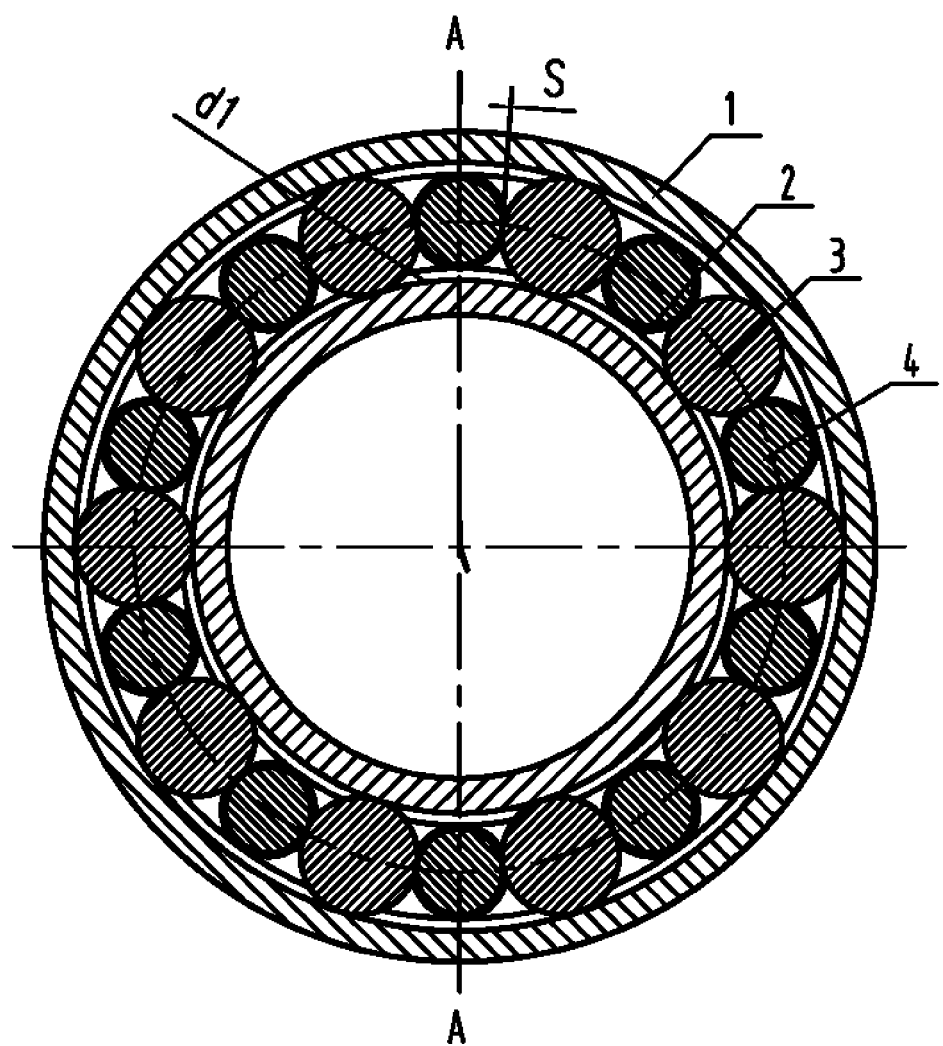
FIG. 1 is a front view of an embodiment of the present disclosure.
Figure 2:
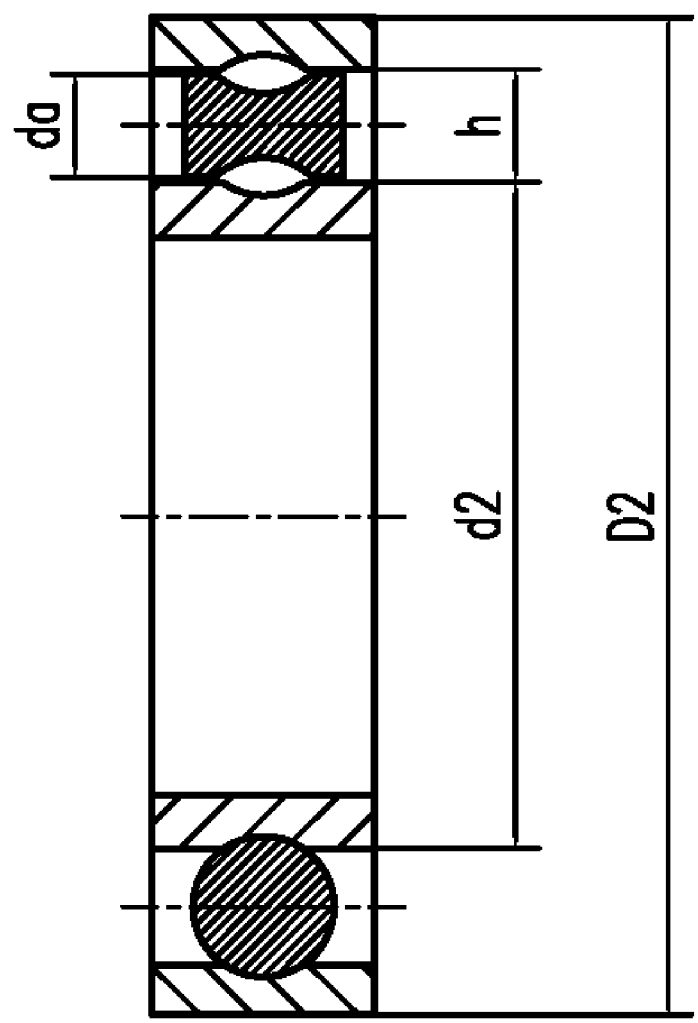
FIG. 2 is a cross-sectional view of FIG. 1 in the A-A direction.

Embodiment: as shown in FIG. 1 and FIG. 2, a rolling deep groove ball bearing comprises a bearing outer ring 1, a bearing inner ring 2, a plurality of large rolling balls 3 and special-shaped rollers 4, the large rolling balls 3 and special-shaped rollers 4 are arranged between the bearing outer ring 1 and the bearing inner ring 2, and the large rolling balls 3 and the special-shaped rollers 4 are arranged at intervals.

Figure 3:
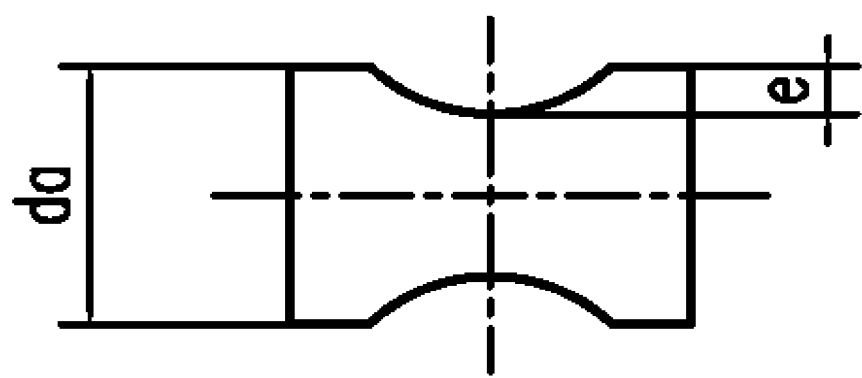
FIG. 3 is a view of a special-shaped roller.

As shown in FIG. 3, a cross section of a groove curved surface of the special-shaped roller 4 may be composed of arcs, logarithmic spirals and other curves or may be composed of straight lines. The groove curved surface is designed to realize axial positioning and radial positioning of the large rolling balls 3. Considering the manufacturing error, a groove depth $e > 0.03\ mm$. The special-shaped roller 4 is easy to fall down, if the groove depth e is too small, and normal operations of the bearing cannot be satisfied. The processing difficulty is increased, if the groove depth e is too large. Through synthetically consideration, the groove depth e is preferably 0.03 mm~d1/3, where d1 is a diameter of the large rolling balls.

As shown in FIG. 1, a relationship between a diameter da of the special-shaped rollers 4 and a distance h between the inner ring and the outer ring is: h-da=0.005~0.2 mm, h is (D2-d2)/2, where D2 is an inner diameter of the outer ring, and d2 is an outer diameter of the inner ring. The special-shaped rollers 4 are easy to be locked and stuck with the inner ring and outer ring, if the value of h-da is too small; the gaps between the special-shaped rollers 4 and the inner and outer rings are too large, if the value of h-da is too large, which not only fails to play a role of positioning, but also occurs the turbulence, makes big noise, and even affects normal work. Therefore, the value of h-da must be set to fully consider the manufacturing error and the assembly error, as well as the impact of various factors throughout the dynamic processing. It is necessary to ensure that the special-shaped roller 4 is not subjected to force during the operation, and at the same time, can also play a role in positioning. The rolling bodies are arranged at intervals of one big and one small, that is, a special-shaped roller 4 is arranged between adjacent two large rolling balls 3. In operation, the large rolling balls 3 are loaded, and the special-shaped rollers 4 are not loaded. During the movement, each of rolling balls 3 and special-shaped rollers 4 not only revolves but also rotates. The rotation directions of the large rolling balls 3 are consistent due to the arrangement at intervals. At this time, the large rolling balls 3 are loaded and subjected to the pure rolling friction, where the friction coefficient is small. Although the special-shaped rollers 4 are in frictional contact with the large rolling balls 3 to reversely rotate, the friction coefficient is small and almost no frictional resistance is generated since the special-shaped roller 4 is not loaded. This effectively solves the problem of sliding friction caused by the sharp increasing of frictional resistance between the rolling balls and a bearing raceway when a traditional deep groove ball bearing with full-ball is working, especially in the case of the high-speed heavily loading, thereby realizing pure rolling friction of the large rolling balls 3 and the raceway.

As shown in FIG. 1, the design of the total gap s between the large rolling balls 3 and the special-shaped roller 4 must match the groove depth of the special-shaped roller 4. The ball is easy to be stuck and to be worn and burned immediately at the high-speed heavily loading, if the gap are too small; the rolling balls are easy to occur the turbulence, make big noise, and even affect normal work, if the gaps are too big. Therefore, the numerical value of the total gap s between the large rolling balls 3 and the special-shaped rollers 4 is: 0.03 mm≤s≤e, wherein e is the groove depth of the special-shaped rollers 4.

The present disclosure not only solves the problem that the rolling balls and the raceway cannot achieve pure rolling friction, but also solves the problems of assembly difficulty and assembly deficiency of the bearing with full-ball, thereby frictional resistance between the rolling balls and the raceway is greatly decreased, and the effect is more significant in the condition of the high-speed heavily loading.

The present disclosure is applicable not only to single row deep groove ball bearing, but also to multi-row deep groove ball bearing and angular contact ball bearing. The present disclosure not only promotes the development of the metallurgy, the electric power, the building machinery, the building materials, the energy and other industries, but also meets the applications of high-end fields such as the automobile, the wind power, the high-grade machine tool, the high-speed rail, the aerospace, the national defense and military, and the like.

The above description is merely embodiments utilizing the present technical content, and any modifications and variations made by those skilled in the art using the present disclosure shall be within the patent scope claimed by the present disclosure, and not limited to those disclosed in the embodiments.

What is claimed is:

1. A rolling ball bearing, comprising a bearing outer ring, a bearing inner ring, a plurality of rolling balls and special-shaped rollers, the rolling balls and special-shaped rollers are arranged between the bearing inner ring and the bearing outer ring, wherein the rolling balls and special-shaped rollers are arranged at intervals; a groove is provided in middle of the special-shaped rollers; a numerical value of a total gap s between the rolling balls and the special-shaped rollers is 0.03 mm≤s≤e, wherein e is a groove depth of the special-shaped rollers; a relationship between a diameter da of the special-shaped rollers and a distance h between the inner ring and the outer ring is h-da=0.005-0.2 mm, wherein h is (D2-d2)/2, D2 is an inner diameter of the outer ring, and d2 is an outer diameter of the inner ring.

2. The rolling ball bearing according to claim 1, wherein a numerical value of the groove depth e is 0.03 mm<e<dl/3, and wherein dl is a diameter of the rolling balls.

3. The rolling ball bearing according to claim 1, wherein the diameter of the rolling balls is larger than the diameter of the special-shaped rollers.

4. The rolling ball bearing according to claim 1, wherein the special-shaped roller is a roller having a groove curved surface, and a cross section of the groove curved surface of the special-shaped roller is composed of arcs, logarithmic spirals, or straight lines.

* * * * *